(12) United States Patent
Kim et al.

(10) Patent No.: US 12,138,716 B2
(45) Date of Patent: Nov. 12, 2024

(54) JIG FOR TACK WELDING OF BATTERY CELL ELECTRODE LEAD

(71) Applicant: LG CHEM, LTD., Seoul (KR)

(72) Inventors: Kyung-Mo Kim, Daejeon (KR); Jin-Yong Park, Daejeon (KR); Ho-June Chi, Daejeon (KR); Seung-Joon Kim, Daejeon (KR); Jeong-O Mun, Daejeon (KR); Hee-Jun Jin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 940 days.

(21) Appl. No.: 17/268,738

(22) PCT Filed: Jan. 7, 2020

(86) PCT No.: PCT/KR2020/000271
§ 371 (c)(1),
(2) Date: Feb. 16, 2021

(87) PCT Pub. No.: WO2020/145626
PCT Pub. Date: Jul. 16, 2020

(65) Prior Publication Data
US 2021/0299801 A1 Sep. 30, 2021

(30) Foreign Application Priority Data
Jan. 8, 2019 (KR) .................. 10-2019-0002469

(51) Int. Cl.
*B23K 37/04* (2006.01)
*B23K 26/70* (2014.01)
*B23K 101/38* (2006.01)

(52) U.S. Cl.
CPC ........ *B23K 37/0443* (2013.01); *B23K 26/702* (2015.10); *B23K 2101/38* (2018.08)

(58) Field of Classification Search
CPC .... B23K 37/0443; B23K 37/04; B23K 26/21; B23K 26/702; B23K 26/22;
(Continued)

(56) References Cited

U.S. PATENT DOCUMENTS

2018/0169790 A1   6/2018   Jin et al.

FOREIGN PATENT DOCUMENTS

| CN | 204449863 U | 7/2015 |
| CN | 107848071 A | 3/2018 |

(Continued)

OTHER PUBLICATIONS

Extended European Search Report dated Feb. 9, 2022 for Application No. 20738817.4.
(Continued)

*Primary Examiner* — Raj R Gupta
(74) *Attorney, Agent, or Firm* — Birch, Stewart, Kolasch & Birch, LLP

(57) ABSTRACT

Discussed is an electrode lead tack welding jig for a battery cell, and the jig including a jig body configured to support at least two battery cells, and a close contact guide unit provided to both ends of the jig body and configured to guide electrode leads of the at least two battery cells to come into close contact when tack welding is performed to the electrode leads by a laser.

13 Claims, 8 Drawing Sheets

(58) Field of Classification Search
CPC ............ B23K 37/0426; B23K 37/0435; B23K 37/0452; B25B 11/02; B25B 11/00; H01M 50/211; H01M 50/516; H01M 50/178; H01M 50/50; H01M 10/0404; H01M 2220/20; H01M 50/105; H01M 50/502; H01M 50/536; H01M 50/548
See application file for complete search history.

(56) References Cited

FOREIGN PATENT DOCUMENTS

| | | |
|---|---|---|
| CN | 207534248 U | 6/2018 |
| CN | 207656105 U * | 7/2018 |
| DE | 102014110915 A1 | 2/2016 |
| JP | 2007-109548 A | 4/2007 |
| JP | 2011-210529 A | 10/2011 |
| JP | 2016-30280 A | 3/2016 |
| JP | 2017-103115 A | 6/2017 |
| JP | 2018-41555 A | 3/2018 |
| KR | 101023184 B1 * | 3/2011 |
| KR | 10-2013-0131658 A | 12/2013 |
| KR | 10-2015-0106026 A | 9/2015 |
| KR | 10-2016-0017574 A | 2/2016 |
| KR | 10-2017-0046910 A | 5/2017 |
| KR | 10-2018-0112616 A | 10/2018 |

OTHER PUBLICATIONS

International Search Report issued in PCT/KR2020/000271 (PCT/ISA/210), dated Apr. 21, 2020.

* cited by examiner

JIG FOR TACK WELDING OF BATTERY CELL ELECTRODE LEAD

TECHNICAL FIELD

The present disclosure relates to an electrode lead tack welding jig for a battery cell.

The present application claims priority to Korean Patent Application No. 10-2019-0002469 filed on Jan. 8, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the conventional battery module, when configuring an assembly of a plurality of battery cells, electrode leads of at least two battery cells are tack-welded in advance, then the tack-welded electrode leads are cut into a required length, and then the entire battery cells are stacked.

Here, in the conventional process of tack-welding electrode leads of at least two battery cells, first, the electrode leads of the at least two battery cells are disposed at a predetermined point for tack welding by using an electrode lead guide jig. After that, the electrode leads of the at least two battery cells are brought into close contact with each other using a separate electrode lead close contact jig, and then the electrode leads in close contact are tack-welded using an ultrasonic welding machine or a laser welding machine.

However, in the conventional electrode lead tack welding process, the electrode lead guide jig and the electrode lead close contact jig are required separately, thereby increasing manufacturing costs since the jigs must be prepared separately. Moreover, since individual jigs are used separately, the overall manufacture time is also increased, thereby giving a disadvantage in terms of process efficiency.

DISCLOSURE

Technical Problem

The present disclosure is directed to providing an electrode lead tack welding jig for a battery cell, which may improve the process efficiency by reducing manufacture cost and time.

Technical Solution

In one aspect of the present disclosure, there is provided an electrode lead tack welding jig for a battery cell, comprising: a jig body configured to support at least two battery cells; and a close contact guide unit provided to both ends of the jig body to guide electrode leads of the at least two battery cells to come into close contact when tack welding is performed to the electrode leads by laser.

The jig body may include a first support member configured to support a lower side of the at least two battery cells; and a second support member pivotally coupled to the first support member by a hinge and configured to support an upper side of the at least two battery cells.

The close contact guide unit may include a first guide member provided to both ends of the first support member; and a second guide member arranged to face the first guide member in a state where the electrode leads of the at least two battery cells are interposed therebetween, the second guide member being provided to both ends of the second support member.

The close contact guide unit may include at least one knob bolt configured to bring the first guide member and the second guide member into closer contact with each other according to a manipulation of a manufacturer or the like.

The second guide member may include a vertical plate mounted to both ends of the second support member; and a horizontal plate bent from a bottom end of the vertical plate and disposed to face the first guide member in a state where the electrode leads of the at least two battery cells are interposed therebetween.

The horizontal plate may have a tack welding guide slit formed to partially expose the electrode leads of the at least two battery cells for tack-welding the electrode leads of the at least two battery cells by laser.

The tack welding guide slit may be formed by a predetermined length along a longitudinal direction of the horizontal plate.

A bottom width of the horizontal plate may correspond to a top width of the first guide member.

The knob bolt may be provided in a pair, and the pair of knob bolts may be disposed to face each other in a state where the electrode leads of the at least two battery cells are interposed therebetween.

The plurality of battery cells may include three battery cells mounted to the jig body, and the electrode leads of the three battery cells may be tack-welded by laser after coming into close contact with each other by the close contact guide unit.

Advantageous Effects

According to various embodiments as above, it is possible to provide an electrode lead tack welding jig for a battery cell, which may improve the process efficiency by reducing manufacture cost and time.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
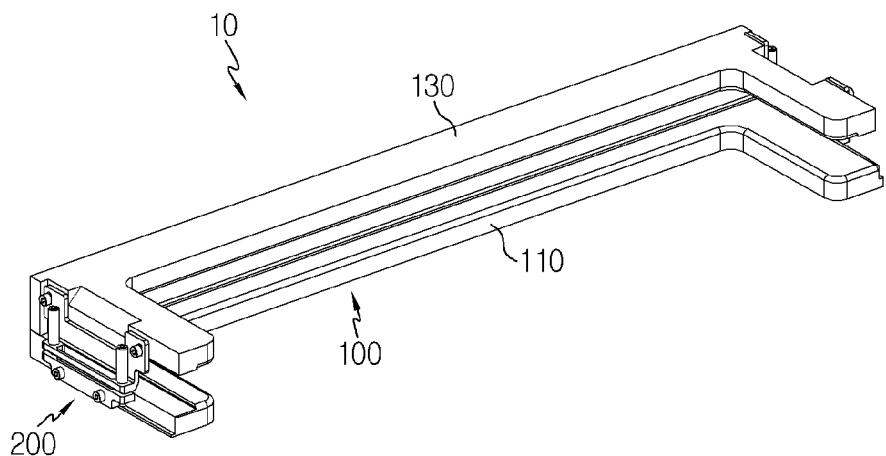
FIG. 1 is a diagram for illustrating an electrode lead tack welding jig for a battery cell according to an embodiment of the present disclosure.
Figure 2:
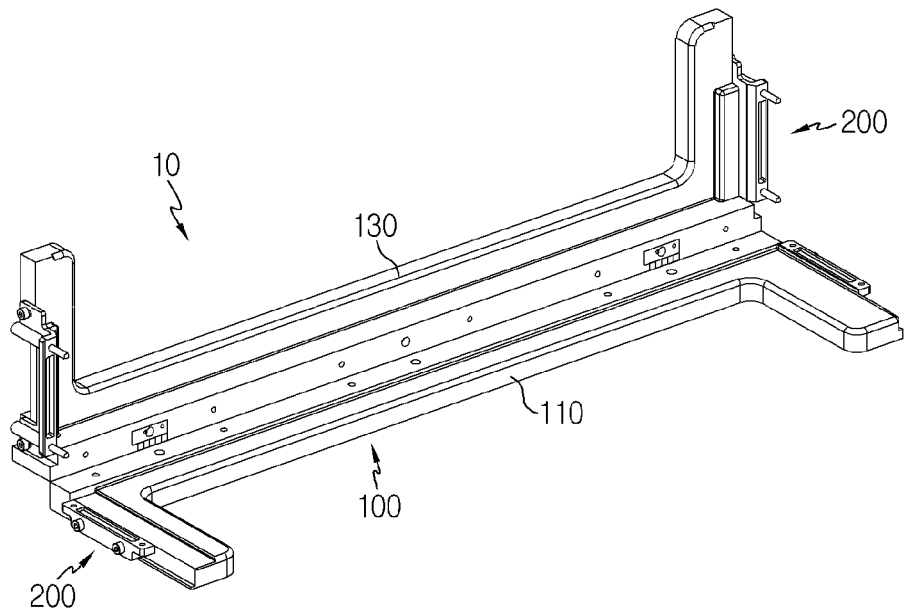
FIGS. 2 and 3 are diagrams for illustrating a rotating operation of the electrode lead tack welding jig of FIG. 1.
Figure 3:
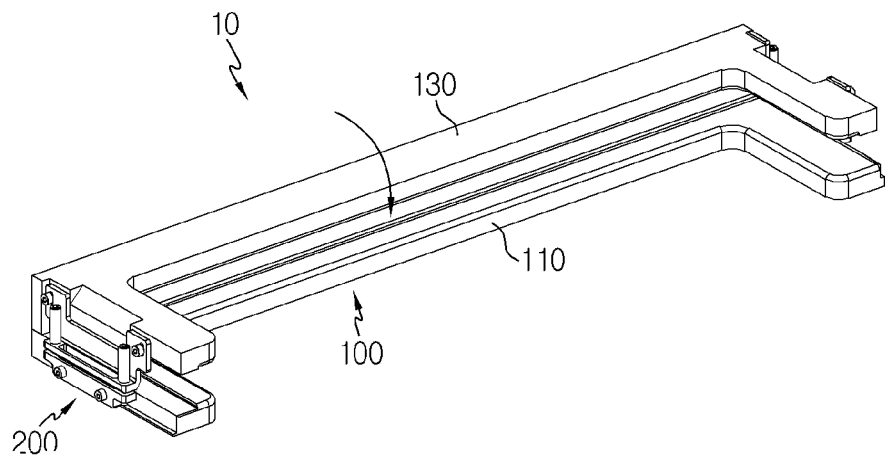
Figure 4:
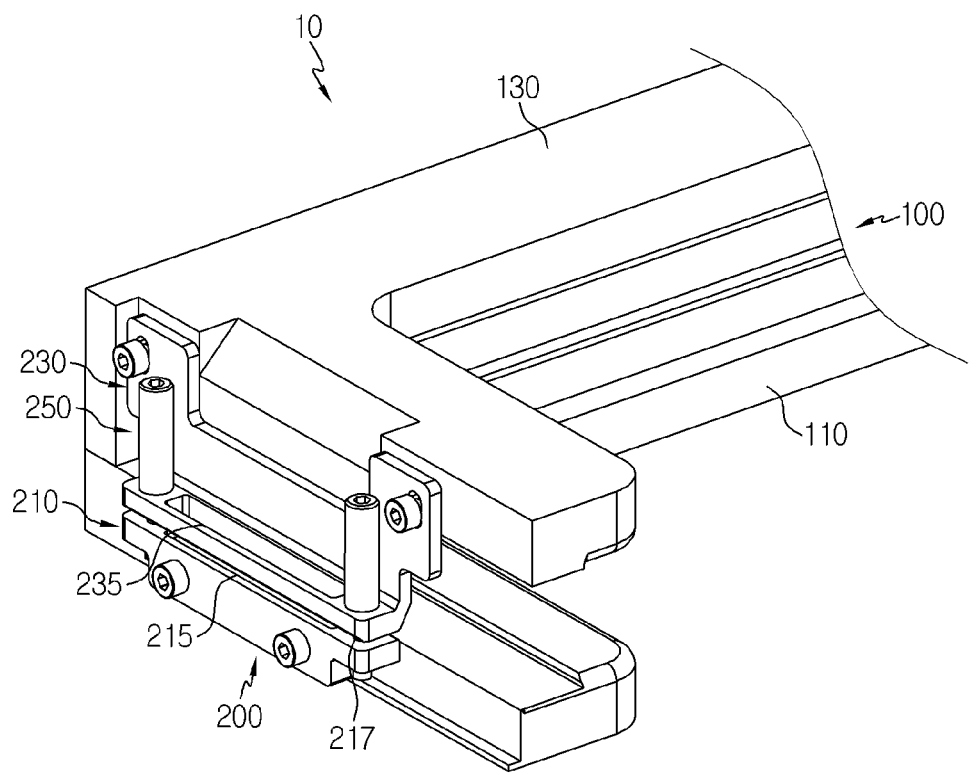
FIGS. 4 and 5 are diagrams for illustrating main parts of the electrode lead tack welding jig of FIG. 1.
Figure 5:
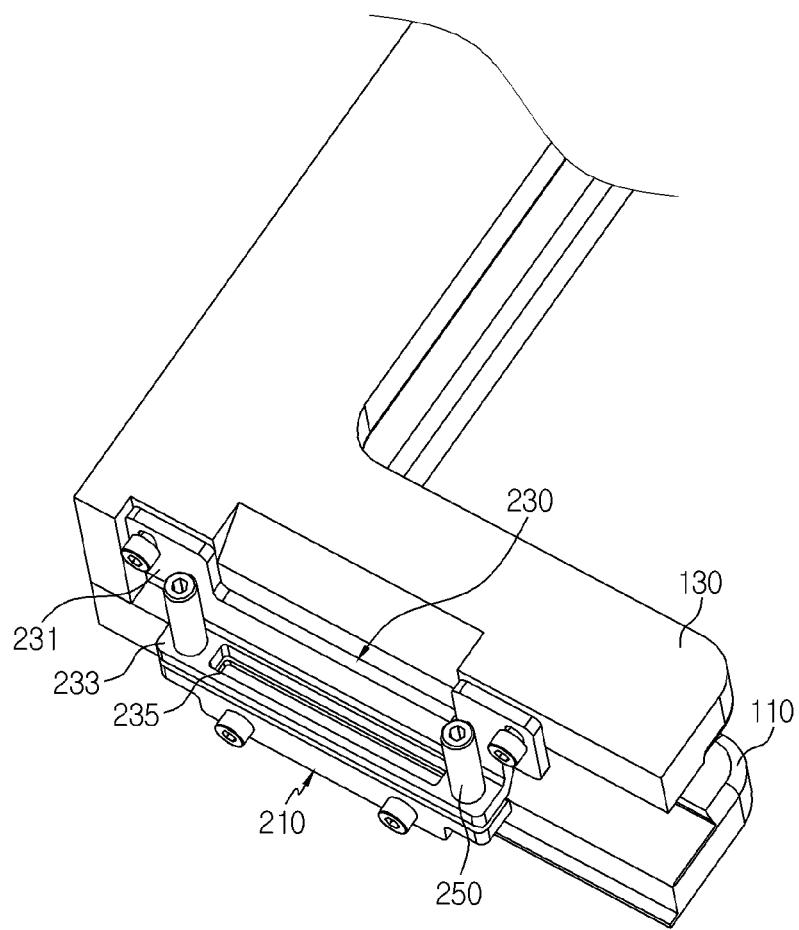
Figure 6:
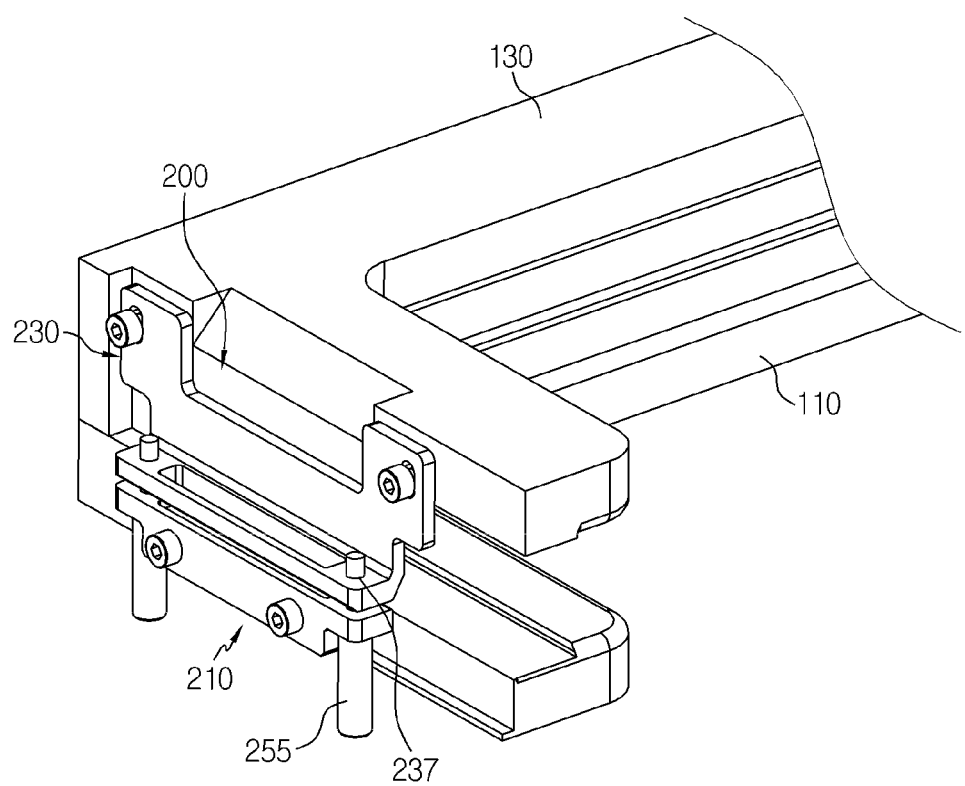
FIG. 6 is a diagram for illustrating another embodiment of a knob bolt of the electrode lead tack welding jig of FIG. 4.
Figure 7:
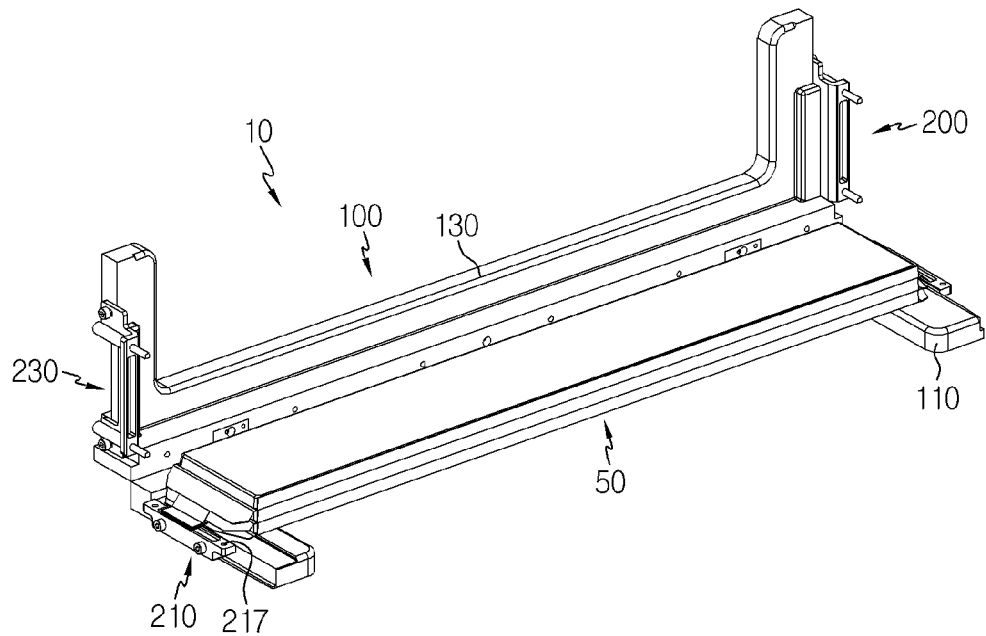
FIGS. 7 to 11 are diagrams for illustrating a tack welding process for electrode leads of battery cells, performed by the electrode lead tack welding jig of FIG. 1.
Figure 8:
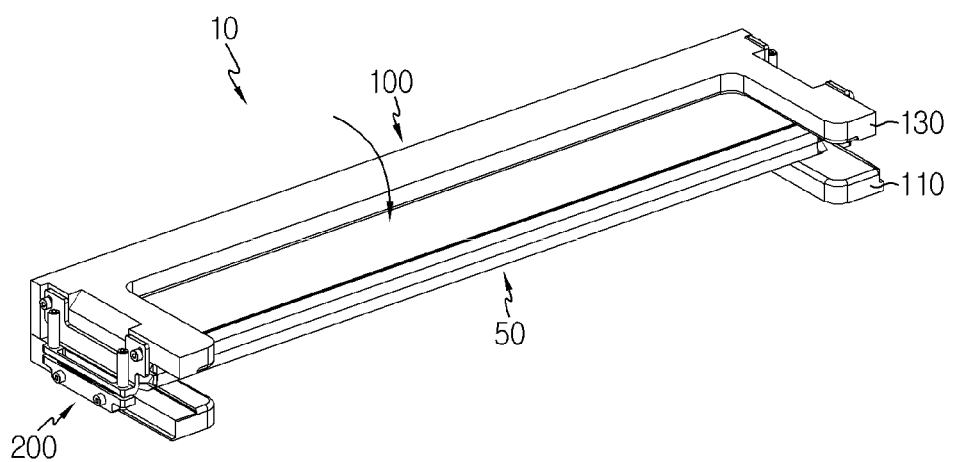
Figure 9:
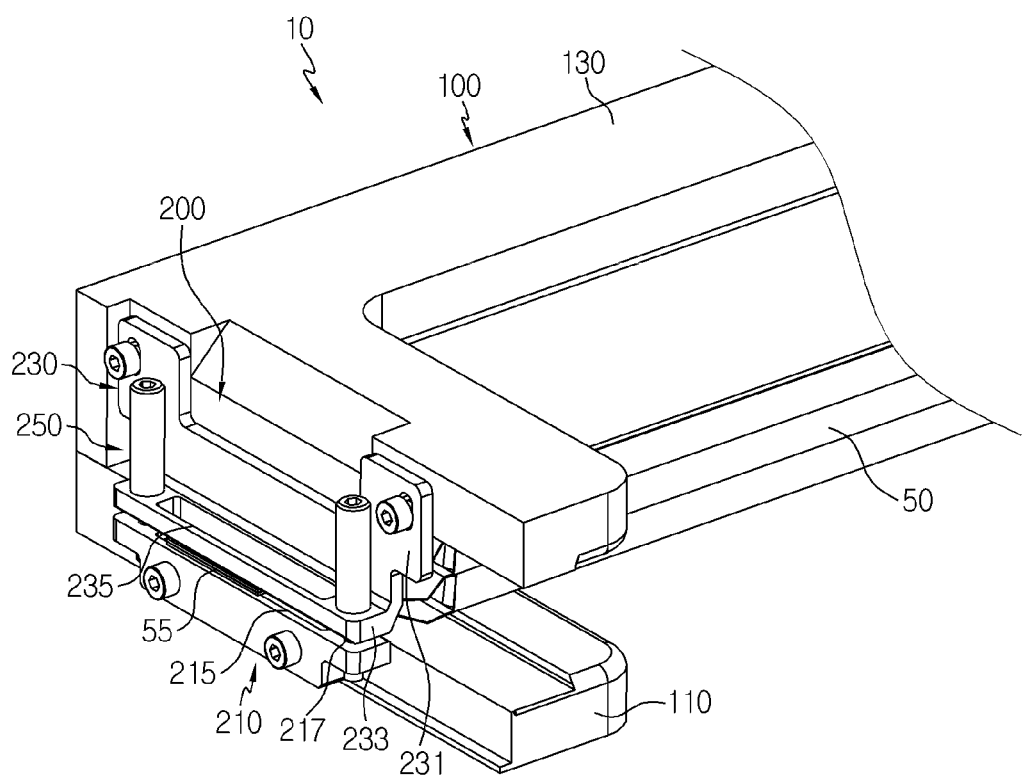
Figure 10:
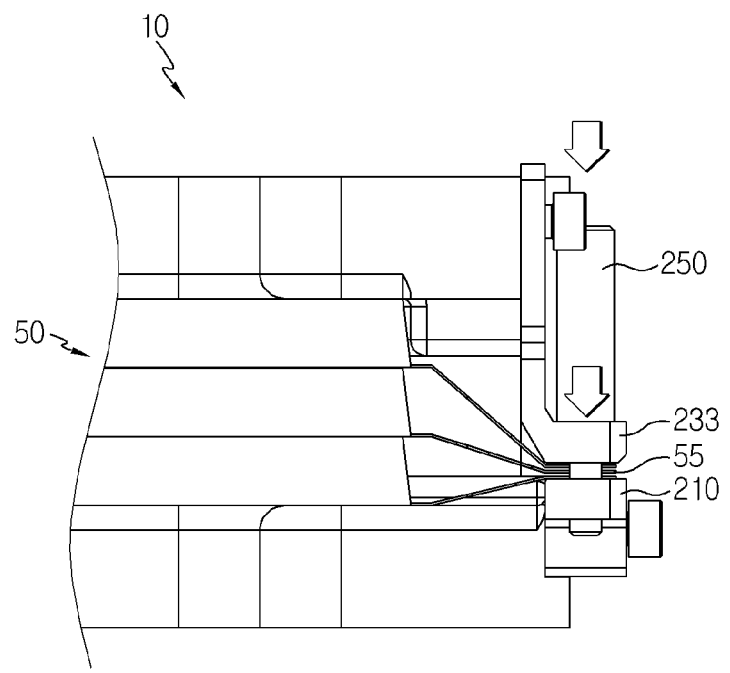
Figure 11:
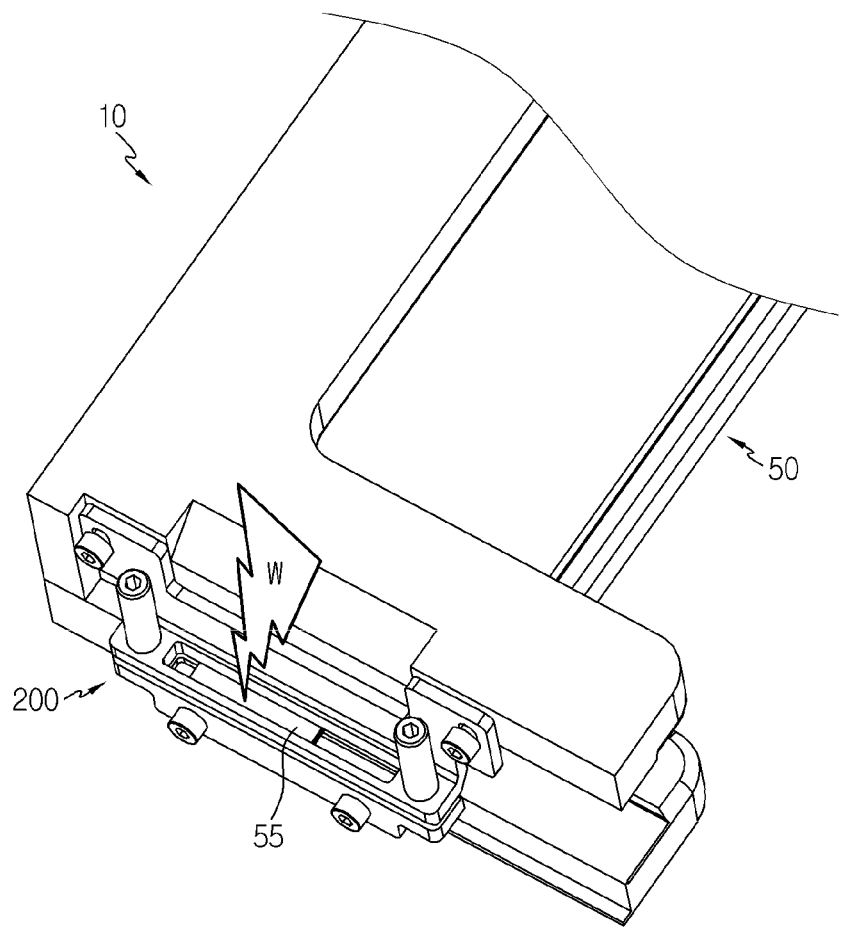

FIG. 1 is a diagram for illustrating an electrode lead tack welding jig for a battery cell according to an embodiment of the present disclosure, FIGS. 2 and 3 are diagrams for illustrating a rotating operation of the electrode lead tack welding jig of FIG. 1, FIGS. 4 and 5 are diagrams for illustrating main parts of the electrode lead tack welding jig of FIG. 1, and FIG. 6 is a diagram for illustrating another embodiment of a knob bolt of the electrode lead tack welding jig of FIG. 4.

Referring to FIGS. 1 to 6, an electrode lead tack welding jig 10 may perform tack welding to electrode leads 55 of battery cells 50 to each other. The battery cells 50 may be stacked in a predetermined number or more to form a battery module or a battery pack.

During a manufacturing process of the battery pack of the battery module, the electrode leads 55 of the battery cells 50 are welded for electrical connection of the battery cells 50. In this welding process, the electrode leads 55 of the battery cells 50 may be tack-welded preferentially, and at this time, a welding process may also be applied to the electrode leads 55 of the battery cells 50. The electrode lead tack welding jig 10 may be applied in the welding process for the tack welding.

In particular, the electrode lead tack welding jig 10 may be mainly applied to a so-called non-bending lead concept module that welds the electrode leads 55 of the battery cells 50 without bending.

The non-bending lead concept module may, for example, perform tack welding to electrode leads 55 of three battery cells 50 to each other, and the electrode lead tack welding jig 10 brings three battery cells 50 into close contact with each other and then perform tack welding to the electrode leads 55 of the three battery cells 50. At this time, the tack welding may be performed through laser tack welding using laser.

Hereinafter, the electrode lead tack welding jig 10 according to this embodiment will be described in more detail.

The electrode lead tack welding jig 10 may include a jig body 100 and a close contact guide unit 200.

The jig body 100 serves to support at least two battery cells 50. Hereinafter, in this embodiment, the jig body 100 will be described as supporting three battery cells 50.

The jig body 100 may include a first support member 110 and a second support member 130.

The first support member 110 may support a lower side of the at least two battery cells 50. In this embodiment, the first support member 110 may support the lower side of three battery cells 50.

The second support member 130 is pivotally coupled to the first support member 110 by a hinge and may support an upper side of the at least two battery cells 50. In this embodiment, the second support member 130 may support the upper side of the three battery cells 50.

The close contact guide unit 200 is provided at both ends of the jig body 100, and may guide the electrode leads 55 to make close contact with each other when the electrode leads 55 of the at least two battery cells 50 are tack-welded by laser.

The close contact guide unit 200 may include a first guide member 210, a second guide member 230 and a knob bolt 250.

The first guide member 210 may be provided at both ends of the first support member 110. The first guide member 210 may include a tack welding guide slit 215 and a knob bolt hole 217.

The tack welding guide slit 215 may partially expose the electrode leads 55 of the at least two battery cells 50 out of the close contact guide unit 200 for tack-welding the electrode leads 55 of the at least two battery cells 50 by laser.

The knob bolt hole 217 may allow a knob bolt 250, explained later, to be fastened therethrough. The knob bolt hole 217 may guide the first guide member 210 and the second guide member 230, explained later, to make close contact with each other according to the degree of fastening with the knob bolt 250, explained later.

The second guide member 230 is provided at both ends of the second support member 130, and may be disposed to face the first guide member 210 in a state where the electrode leads 55 of the at least two battery cells 50 are interposed therebetween.

The second guide member 230 may include a vertical plate 231, a horizontal plate 233 and a tack welding guide slit 235.

The vertical plate 231 may be mounted to both ends of the second support member 130.

The horizontal plate 233 is bent from a bottom end of the vertical plate 231, and may be disposed to face the first guide member 210 in a state where the electrode leads 55 of the at least two battery cells 50 are interposed therebetween.

The electrode leads 55 of the at least two battery cells 50 may be disposed between a bottom end of the horizontal plate 233 and a top end of the first guide member 210. For more stable arrangement of the electrode leads 55 of the at least two battery cells 50, a bottom width of the horizontal plate 233 may be formed to correspond to a top width of the first guide member 210.

The tack welding guide slit 235 is provided to the horizontal plate 233, and the electrode leads 55 of the at least two battery cells 50 may be partially exposed out of the close contact guide unit 200 for tack-welding the electrode leads 55 of the at least two battery cells 50 by laser.

The tack welding guide slit 235 is formed to have a predetermined length along a longitudinal direction of the horizontal plate 233, and may be provided corresponding to the tack welding guide slit 215 of the first guide member 210.

The knob bolt 250 can may bring the first guide member 210 and the second guide member 230 into closer contact with each other according to a manipulation of a manufacturer or the like. At least one knob bolt 250, or a plurality of knob bolts 250, may be provided.

In this embodiment, the knob bolt 250 may be provided in a pair.

The pair of knob bolts 250 may be disposed to face each other in a state where the electrode leads 55 of the at least two battery cells 50 are interposed therebetween, and may be screwed according to the manipulation of the manufacturer or the like so that the first guide member 210 and the second guide member 230 may make closer contact with each other.

The manipulation for screw-fastening the pair of knob bolts 250 may be performed at the upper side of the second guide member 230. Meanwhile, as shown in FIG. 6, the knob bolt 255 may also be mounted such that the screw-fastening manipulation is performed at the lower side of the first guide member 230. In this case, the second guide member 230 may have a knob bolt hole 237 through which an end of the knob bolt 255 is fastened.

Hereinafter, the tack welding process of the electrode lead tack welding jig 10 for the battery cells 50 according to this embodiment will be described in more detail.

Specifically, the tack welding process of the electrode lead tack welding jig 10 for the battery cells 50, explained later, will be described based on the tack welding process for the electrode leads 55 of three battery cells 50.

FIGS. 7 to 11 are diagrams for illustrating a tack welding process for electrode leads of battery cells, performed by the electrode lead tack welding jig of FIG. 1.

Referring to FIGS. 7 to 11, three battery cells 50 may be provided and mounted to the jig body 100. Specifically, the three battery cells 50 may be placed on the first support member 110.

After that, the manufacturer or the like may pivot the second support member 130 of the jig body 100 to more stably fix the upper side of the three battery cells 50.

According to this pivoting, the electrode leads 55 of the three battery cells 50 may come into close contact with each other while being positioned by the close contact guide unit 200. That is, according to the pivoting of the second support member 130, the close contact guide unit 200 may automatically position the electrode leads 55 of the three battery cells 50 onto the tack welding position.

Meanwhile, the manufacturer or the like may bring the electrode leads 55 of the three battery cells 50 into closer contact with each other so that the tack welding process for the electrode leads 55 of the three battery cells 50 may be further performed more efficiently.

Specifically, the manufacturer or the like may manipulate the knob bolt 250 so that the first guide member 210 and the second guide member 230, specifically the top end of the first guide member 210 and the bottom end of the horizontal plate 233 of the second guide member 230, move closer to each other to bring the electrode leads 55 into closer contact with each other.

After that, the manufacturer or the like may perform tack welding to the electrode leads 55 of the three battery cells 50 exposed through the tack welding guide slit 215 of the first guide member 210 and the tack welding guide slit 235 of the second guide member 230 through laser welding W.

As described above, in this embodiment, during the tack welding process for the electrode leads 55 of the battery cells 50, it is possible to simultaneously perform positioning, close contacting and tack welding to the electrode leads 55 using one electrode lead tack welding jig 10, and thus a plurality of jigs such as electrode lead guide jig and a close contact jig may not be required separately.

Thus, in this embodiment, by using the electrode lead tack welding jig 10 capable of simultaneously performing positioning, close contacting and tack welding to the electrode leads 55 of the battery cells 50, it is possible to significantly reduce the manufacturing cost and time.

According to the above embodiments, it is possible to provide the electrode lead tack welding jig 10 for the battery cell 50, which may increase manufacturing efficiency by reducing manufacturing cost and time.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. An electrode lead tack welding jig for a battery cell, the electrode lead tack welding jig comprising:
   a jig body configured to support at least two battery cells; and
   a close contact guide unit provided to both ends of the jig body and configured to guide electrode leads of the at least two battery cells to come into close contact when tack welding is performed to the electrode leads by a laser,
   wherein the jig body includes:
      a first support member configured to support a lower side of the at least two battery cells; and
      a second support member pivotally coupled to the first support member by a hinge and configured to support an upper side of the at least two battery cells,
   wherein each of the first support member and the second support member includes a first part that extends in a longitudinal direction of the jig body, and a pair of second parts extending from the first part in a direction that intersects the longitudinal direction at opposite ends of the first part,
   wherein each second part has a connected end that connects to the first part and a free end that is opposite to the connected end, and
   wherein the hinge is attached to the first part and the close contact guide unit is attached to the second part.

2. The electrode lead tack welding jig for a battery cell according to claim 1,
   wherein the close contact guide unit includes:
   a first guide member provided to both ends of the first support member; and
   a second guide member arranged to face the first guide member in a state where the electrode leads of the at least two battery cells are interposed therebetween, the second guide member being provided to both ends of the second support member.

3. The electrode lead tack welding jig for a battery cell according to claim 2,
   wherein the close contact guide unit includes at least one knob bolt configured to bring the first guide member and the second guide member into contact with each other according to a manipulation of a user.

4. The electrode lead tack welding jig for a battery cell according to claim 3,
   wherein the second guide member includes:
   a vertical plate mounted to both ends of the second support member; and a horizontal plate bent from a bottom end of the vertical plate and disposed to face the first guide member in a state where the electrode leads of the at least two battery cells are interposed therebetween.

5. The electrode lead tack welding jig for a battery cell according to claim 4,
wherein the horizontal plate has a tack welding guide slit formed to partially expose the electrode leads of the at least two battery cells for tack-welding the electrode leads of the at least two battery cells by the laser.

6. The electrode lead tack welding jig for a battery cell according to claim 5,
wherein the tack welding guide slit is formed by a predetermined length along a longitudinal direction of the horizontal plate.

7. The electrode lead tack welding jig for a battery cell according to claim 5, wherein the at least one knob bolt is provided in a pair, and
wherein the tack welding guide slit is formed between the pair of knob bolts.

8. The electrode lead tack welding jig for a battery cell according to claim 4,
wherein a bottom width of the horizontal plate corresponds to a top width of the first guide member.

9. The electrode lead tack welding jig for a battery cell according to claim 4, wherein the vertical plate is disposed between the at least one knob bolt and the second support member.

10. The electrode lead tack welding jig for a battery cell according to claim 3,
wherein the at least one knob bolt is provided in a pair, and
wherein the pair of knob bolts are disposed to face each other in a state where the electrode leads of the at least two battery cells are interposed therebetween.

11. The electrode lead tack welding jig for a battery cell according to claim 3, wherein the close contact guide unit further includes at least one knob bolt hole configured to allow the at least one knob bolt to be fastened therethrough.

12. The electrode lead tack welding jig for a battery cell according to claim 1,
wherein the at least two battery cells include three battery cells mounted to the jig body, and
wherein the electrode leads of the three battery cells are tack-welded by the laser after coming into contact with each other by the close contact guide unit.

13. The electrode lead tack welding jig for a battery cell according to claim 1, wherein the close contact guide unit has a connected end that connects to the second part and a free end that is opposite to the connected end and distal from the connected end in a another direction that is perpendicular to both the longitudinal direction and the direction that intersects the longitudinal direction.

* * * * *